Nov. 22, 1960
A. N. TOWNE
2,961,555
ENCAPSULATED STATOR AND METHOD OF MAKING THE SAME
Filed June 7, 1957
2 Sheets-Sheet 2
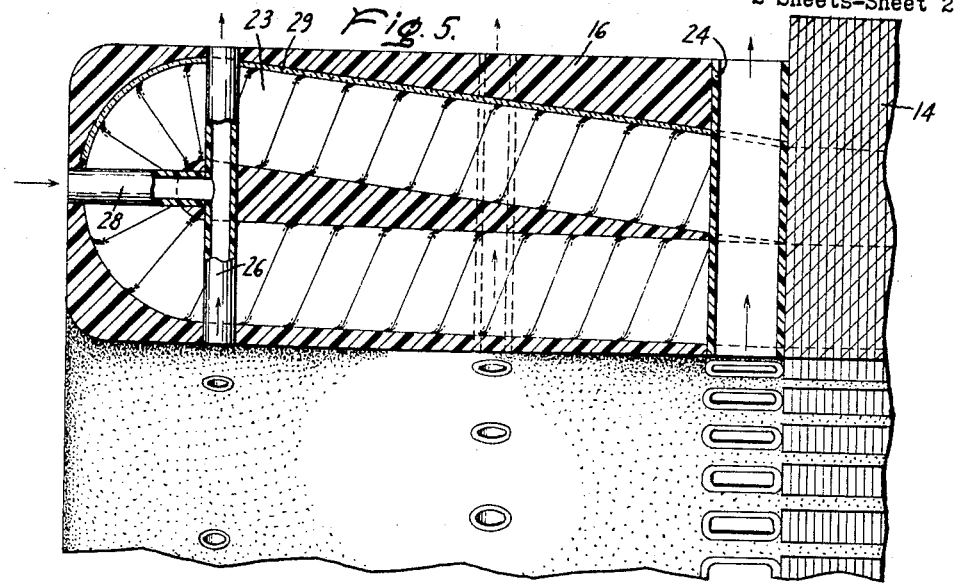
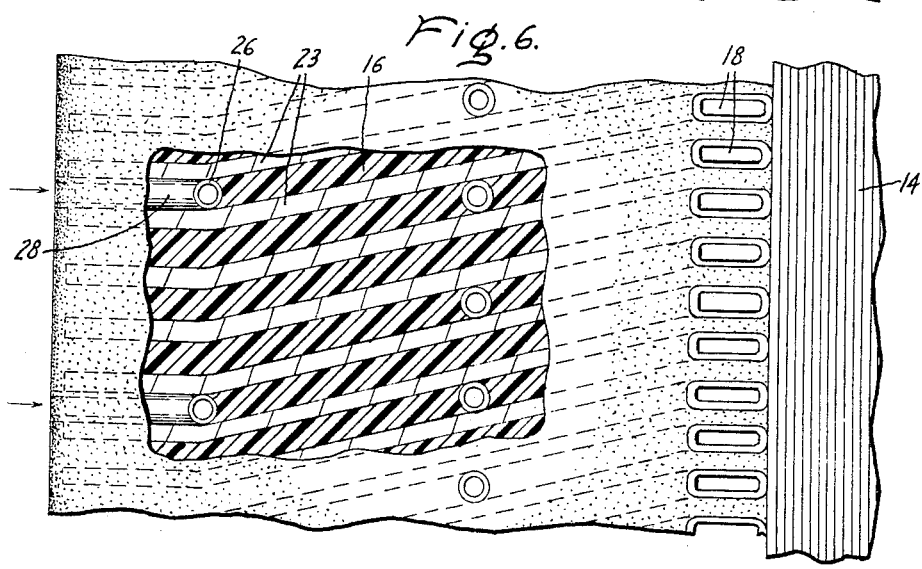
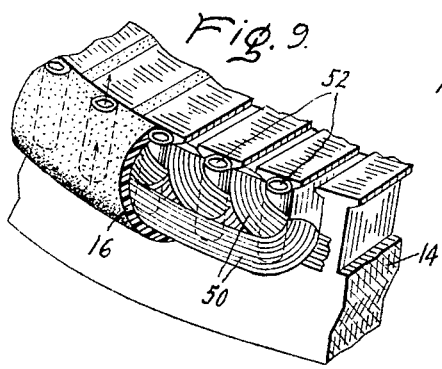
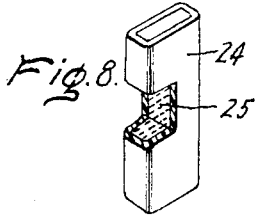
Inventor:
Allen N. Towne,
by Vernon J. Kalb
His Attorney.

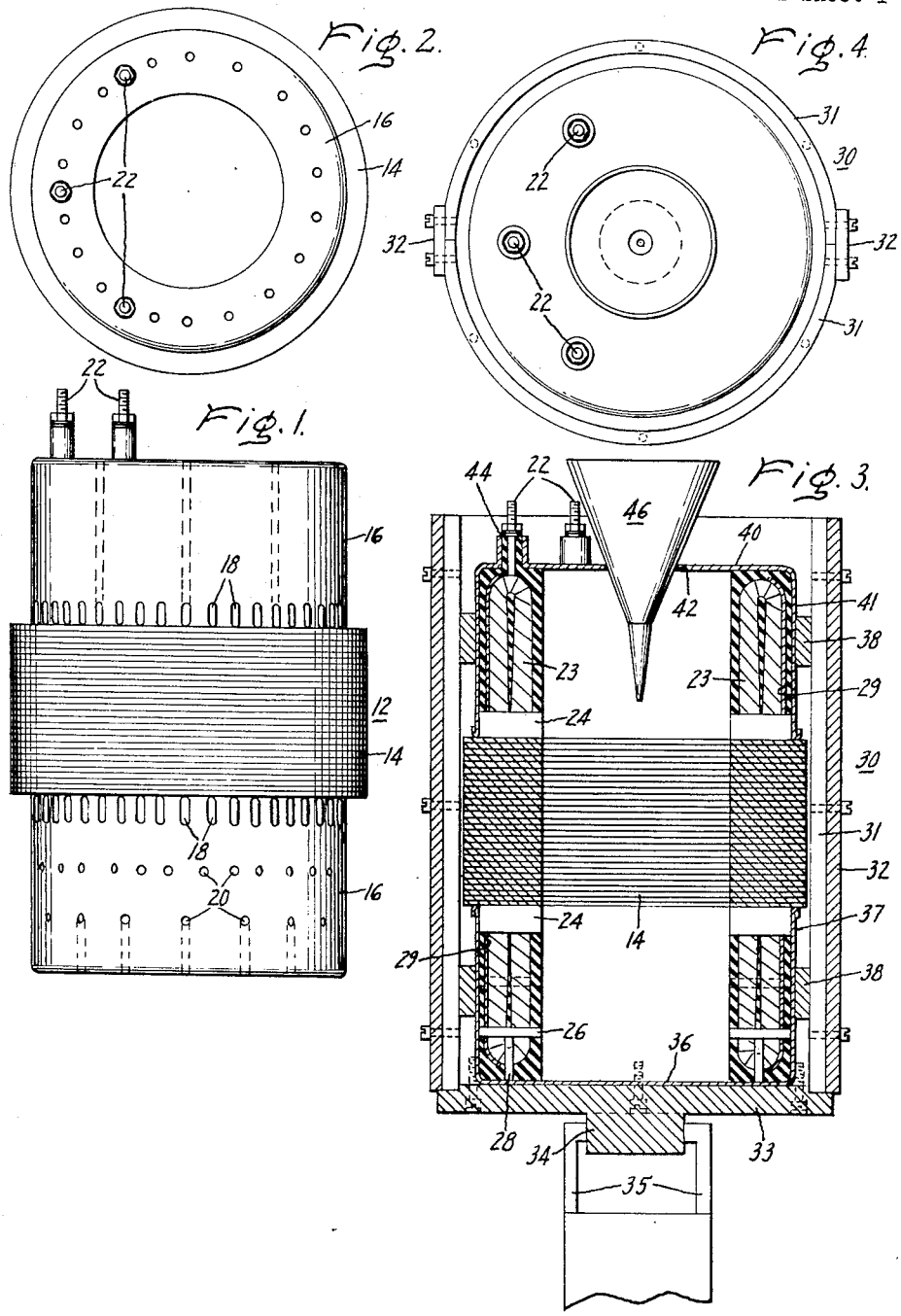
Nov. 22, 1960 — A. N. TOWNE — 2,961,555
ENCAPSULATED STATOR AND METHOD OF MAKING THE SAME
Filed June 7, 1957 — 2 Sheets-Sheet 1
Inventor:
Allen N. Towne,
by Vernon F. Kalb
His Attorney.

United States Patent Office 2,961,555
Patented Nov. 22, 1960

2,961,555
ENCAPSULATED STATOR AND METHOD OF MAKING THE SAME

Allen N. Towne, Scotia, N.Y., assignor to General Electric Company, a corporation of New York Filed June 7, 1957, Ser. No. 664,267

7 Claims. (Cl. 310—43)

The invention described herein relates to dynamoelectric machines and more particularly to an improved encapsulated stator and method of completely enclosing stator end turns to permit operation of a motor under adverse atmospheric conditions or while submerged in a liquid.

The concept of encapsulating end turns of a stator is not new and many attempts have been made in the past to design a protective envelope for the end turns because of the desirable attributes inherent in this type construction. Prior motor stators have been encapsulated with plastic materials but difficulties have been encountered in both the design and encapsulating materials which preclude the manufacture of such machines on a commercial basis. The principal problems relate to the plastic materials used because they do not possess sufficient elasticity to adequately handle the effects of thermal expansion and contraction when subjected to heat cycling. The elastic properties of the plastic material is different from that of the copper, aluminum or iron normally utilized in the machine, so that cracking of the plastic occurs during machine operation. Difficulty also has been encountered in attempting to overcome the problem of transferring heat from the solid mass of plastic material because it normally has poor heat conduction and radiation properties. As a result, heat cannot be dissipated properly from the end turns and consequent overheating of the motor thus develops. Also, costs for a mold used in casting the plastic around the stator end turns are very high because of the special types of tools and mold required to satisfactorily carry out a casting process. Different molds and tools have been required for each particular frame size because of variations in bore diameter, stack height and winding overhang.

These and other problems of lesser importance have effectively precluded the successful construction of an encapsulated machine capable of producing foreseeable and desirable results.

Accordingly, the primary object of my invention is to eliminate the above-noted deficiences in prior machines and to provide a stator having its end turns encapsulated in a material of sufficient elasticity capable of withstanding the forces caused by thermal expansion and contraction, while simultaneously providing adequate heat transfer properties for preventing overheating of the machine during operation.

A further object of the invention is the provision of a simple and inexpensive mold adaptable to different stator frame sizes and capable of permitting the casting of plastic material around the end turns within a minimum period of time.

In carrying out my invention, I insert a plurality of wax-filled tubes between adjacent bar conductors and in a direction perpendicular to the axis of the stator. A glass mat or cloth is wrapped around the outer peripheral surface of the end turns and terminals are attached to the stator winding at appropriate points and are arranged to extend outwardly in a direction axially of the stator. The stator is then placed in a mold and a plastic material poured into the inner portions thereof while it is being rotated at a predetermined speed. The centrifugal force resulting from such rotation, causes the plastic material to be directed outwardly around the end turns and projecting terminals. Upon curing of the stator, the wax in the previously mentioned tubes is caused to melt thus providing air ducts capable of ventilating the machine and the glass mat serves to prevent outward displacement of the end turns during machine operation.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawings in which:

Figure 1 is a view in elevation of a stator having its end turns completely encapsulated in a plastic material;

Figure 2 is a top view of the encapsulated stator shown in Figure 1;

Figure 3 is a sectional view in elevation illustrating the arrangement of parts immediately after casting of the plastic material around the stator end turns;

Figure 4 is a top view of the apparatus illustrated in Figure 3;

Figure 5 is a sectional view in elevation of a single encapsulated end turn showing the arrangement of glass mat and air ducts in the machine;

Figure 6 is a plan view of the stator shown in Figure 5;

Figure 7 is a perspective view of a wax-filled tube utilized in providing air ducts in the stator;

Figure 8 is a perspective view of another type of air duct in the stator; and

Figure 9 illustrates the application of the teachings of the invention to a random wound stator.

Referring now to the drawings wherein like reference characters designate like or corresponding parts throughout the several views, there is shown in Figure 1, a completely encapsulated stator 12 consisting of a plurality of laminations 14 and having a plastic envelope 16 enclosing end turns normally protruding outwardly on each end thereof. As shown in Figure 1, the plastic envelope on each side of the laminations is provided with a plurality of rectangular shaped duct openings 18 and circular openings 20 spaced at varying intervals around the peripheral portion of the stator. Terminals 22 are provided on one end thereof for connection to cables utilized in providing electric power to the motor.

In carrying out the process employed for providing the improved machine, a conventional form wound stator consisting of laminations having slots disposed in the inner peripheral surface thereof and arranged to receive conductors in the usual manner is selected for encapsulation. The end turns 23 usually are not provided with insulation, although a single wrap is shown herein, and tying of the end turns is eliminated because the plastic material 16 arranged to surround the end turns, as hereinafter described, restricts peripheral displacement. Wax-filled tubes 24 of rectangular configuration are inserted between adjacent end turns and contiguous to the laminations for ultimately providing air ducts for cooling and ventilating purposes. Additional wax-filled tubes 26 of cylindrical form are likewise positioned between the end turns but at a point spaced outwardly from tubes 24. Axially directed wax-filled tubes 28 connect with tubes 26 and are also employed for carrying away heat from the machine. In the usual construction, the tubes fit frictionally between adjacent turns and tying or other securing means need not be resorted to for affixing the tubes in a preset position, although tying may be used, if desired. In order to prevent the end turns from bending outwardly as a result of magnetic forces during machine operation, the outer peripheral portions thereof are wrapped with a glass mat taping 29 or similar non-elastic organic or inorganic material, such as Dacron, for precluding such movement. The terminals 22 are secured to the end turns in any conventional manner, as by brazing, and as hereinafter described, the terminals are arranged to fit in fluid tight relationship with the plastic material surrounding the end turns.

With the stator prepared in the manner described above, a hollow cylindrical mold container 30 consisting of a pair of semi-cylindrical shells 31, removably joined together by plates and bolts 32, are arranged for positioning on a plate 33. The plate is equipped with an outwardly protruding portion 34 adapted to be held firmly by the jaws 35 of a lathe. A cup 36 of a diameter slightly less than the outer diameter of the lamination, is inserted therein and arranged for positioning against the bottom end of plate 33. The stator with its attached wax-filled tubes, terminals and glass mat taping is then placed in the container and the end turns are caused to be spaced a short distance from the inner surface of the plate 33 by the walls 37 of cup 36 which abut both the plate and magnetic core laminations 14. The mold container is designed to accommodate stators having different dimensions within a particular frame size. These different dimensions result from variances in the stack height of laminations, end turn overhang and total length. As shown in Figure 3, the container is made sufficiently long to handle the various stator sizes and to assure proper positioning of cups 36 and 40 within the container, spacer rings 38 are placed within the container at the points illustrated. Obviously, the mold container could be used for smaller size stators by merely changing the internal diameter and length of the cups and spacer rings, although it probably would be just as economical to provide a new container and associated parts to fit the different stator frames.

The opposite end of the container mold 30 is closed by a cup 40 having walls 41, a central opening 42 and openings 44 at spaced intervals for receiving the protruding portions of terminals 22. As illustrated in Figure 3, the cup is of sufficient height to provide a clearance between its bottom end and the exposed surface of the stator windings to permit flow of plastic material therearound.

In order to obtain a casting of plastic material around the stator end turns, a funnel 46 having one end adapted to receive a supply of plastic material and its other end terminating within the stator core, is arranged to fit through the opening 42 in cup 40. After the funnel is placed in position, the container with its enclosed stator is caused to be rotated and as the plastic material drips or flows from the funnel, it is caused to gravitate toward the outer surfaces of the stator thus assuring a complete filling of spaces surrounding the end turns.

Each topstick normally provided in the stator slots is replaced with several small sections approximately one-eighth inch in length. The resulting spacing in the slot also permits the plastic to penetrate and fill the slot. The mold is rotated at 125 r.p.m. during the time that the plastic material is poured into the mold. Upon completion of the pouring process, the speed is increased to 472 r.p.m. until the plastic mass becomes hard, normally consuming approximately 45 minutes. The stator is then removed from the mold container and heated until curing is completed. Finally, the excess plastic is machined from the bore and openings cut in the glass mat at points immediately above each of the tubes utilized for cooling the machine. The above speeds are not critical and were used because this was the speed range of the length used in rotating the core. A low speed is utilized to prevent the resin from splattering out of the mold.

A sectional view of a single end turn 23 encapsulated with a plastic material in accordance with the above-described process, is illustrated in Figure 5 wherein the relative disposition of parts is shown. In the actual embodiment, air duct tubes 24, 26 and 28 are spaced approximately as illustrated and the plastic encapsulates the end turns to the degree depicted on the drawing. As previously indicated, the function of the wax-filled tubes is to provide ventilation for the machine. These tubes preferably are made of synthetic fibrous materials capable of withstanding heat produced during the curing cycle and are shaped to the configuration shown. It will be evident that other tube configurations may readily be restored to and their disposition with respect to the laminated core and to the end turns may be varied. Their number may be increased also to satisfy the ventilation requirements for any particular machine since such requirements will change in accordance with the maximum temperature rise permitted. Although wax 25 is utilized for preventing the resinous material from filling the tubes, it will be apparent that other substitutes for the wax can be used. In the alternative, the tubes may be eliminated and air ducts drilled in the plastic mass at preselected points. Also, tubes may be constructed of a firm plastic material or they may consist of a soft pliable substance, such as felt. It has been found that the resinous material permeates the felt during the casting process and when the stator is cured thereafter, the wax flows from the tubes thus leaving air ducts having a smooth internal surface free of any protuberances which otherwise would impede the flow of ventilating air therethrough.

Different types of plastic or resinous materials may be utilized in encapsulating the stator end turns, such as polyesters, phenolics and epoxy resins with or without a filler material. A particular resin found to be especially suitable was an epoxy resin having a filler of magnesium oxide. This resin consisted of twelve parts of a complex epoxide resin comprising a polyether derivative of a polyhydric organic compound, for example, a polyhydric alcohol ether, in which the polyether derivative contains epoxy groups which for brevity will be referred to as an ethoxylin resin; seven parts of talc consisting of aluminum silicate pigments; one part red iron oxide; 6% of Tris-(dimethyl animomethyl) phenol; and 30% to 50% by weight of magnesium oxide. All of these elements are normally mixed together except the Tris phenol catalyst which is added immediate prior to use. It has been found that the filler of magnesium oxide serves to transmit readily the heat imparted to it from the stator end turns. Such heat is then effectively conducted through the various air ducts provided in the plastic envelope and carried to the atmosphere thereby successfully ventilating the machine and keeping its operating temperature within acceptable limits. In the alternative, silicone rubber and silicone resins also may be used in lieu of the specific materials described above. Samples made with magnesium oxide filled epoxy resins have a thermal resistivity of 63.4 per ° C. inch square per watt inch; as compared to the resistivity of talc filled epoxy resins of 80.7° C. inch square per watt inch.

The modification illustrated in Figure 9 is similar to that previously disclosed although a different type of mold container is used for enclosing random windings 50 extending outwardly from the stator core. The air ducts 52 are inserted between adjacent end turns as shown and serve the same purpose as those previously described.

Tests conducted on various types of machines provided with and without cooling means produced the following typical results:

| Type of Motor | Temp. Rise by Resistance, °C. | Winding Temp. rise by Thermocouple, °C. | Temp. Rise of Core by Thermocouple, °C. |
|---|---|---|---|
| Standard open 6 pole motor | 35 | 32 | 32 |
| Cast Stator 6 pole (no cooling) | 54 | 37 | 33 |
| Cast Stator 6 pole with cooling ducts | 38 | 38 | 38 |

A summary of the desirable results for achieving a motor constructed in accordance with the invention disclosed herein shows that taping operations for the end turns, dipping, impregnation of the coils and prior bracing and tying means can be eliminated. The stators are resistant to attack from most chemicals, thus permitting operation in contaminated atmospheres although this will depend on the type of resinous material used. Operation of such stators while submerged in a liquid is also made possible.

In view of the above, it will be apparent that many modifications and variations are possible in light of the above teachings. It therefore is to be understood that within the scope of the appended claims, the invention may be practiced otherwise than as specifically described.

What I claim as new and desire to secure by Letters Patent of the United States is:

1. A stator for a dynamoelectric machine comprising a magnetic core having coil receiving slots and end turns extending outwardly from coils arranged for positioning therein, a plastic envelope completely enclosing said end turns and being provided with air ducts extending from the inner to the outer peripheral surface of that part of said envelope encapsulating the end turns for transferring heat from said stator during machine operation.

2. A stator for a dynamoelectric machine comprising a magnetic core having coil receiving slots and end turns extending outwardly from coils arranged for positioning therein, a plastic envelope encapsulating said end turns and comprising a resinous material having a heat conducting filler therein, terminal posts embedded in said resinous material and being adapted for connection to a power source, and air ducts extending between the end turns and through said envelope and at an angle to the axis of said stator for carrying away heat transferred to said resinous material by the end turns during machine operation.

3. The combination according to claim 2 wherein an inorganic tape is wrapped peripherally around the end turns in said stator.

4. A stator for a dynamoelectric machine comprising a magnetic core having coil receiving slots and end turns extending outwardly from coils arranged for positioning therein, a plastic envelope encapsulating said end turns, air ducts extending through said envelope at an angle to the axis of said stator, said air ducts comprising a first set of hollow tubes extending between adjacent conductors and positioned at a point contiguous to and on opposite sides said core, a second set of hollow tubes spaced outwardly from said first set, and a third set of tubes in the ends of said envelope arranged for connection to said second set so that during operation of said machine, air flowing through each of said sets of tubes carries away heat transferred to said plastic envelope from said end turns during operation of said machine.

5. A stator for a dynamoelectric machine comprising a magnetic core having coil receiving slots and end turns extending outwardly from coils arranged for positioning therein, a plastic envelope encapsulating said end turns, said envelope comprising a resinous material having a heat conducting filler of magnesium oxide therein, terminal posts embedded in an end of said envelope and connected at one end to said coils and adapted for connection at their other ends to a source of power, and air ducts in said envelope extending transversely to the axis of said stator and between adjacent end turns for carrying away heat transferred to said resinous material during machine operation.

6. A method of encapsulating the end turns of coils extending outwardly from a stator for dynamoelectric machine comprising the steps of inserting tubes between said end turns, enclosing said end turns with a tape of inorganic material and placing said stator in a mold, rotating said mold while simultaneously feeding a liquid plastic material into a central opening provided in said stator so as to completely encapsulate said end turns with said material, and curing said plastic material upon completion of the plastic feeding process so as to form a firm homogeneous plastic mass around said end turns.

7. A method of encapsulating the end turns of coils extending outwardly from a stator for a dynamoelectric machine comprising the steps of inserting wax-filled tubes between said end turns and enclosing said end turns with a glass mat taping, attaching terminal leads to preselected coils comprising the winding for said machine, placing said stator in a mold and rotating the same while feeding a resinous material into a central part of said stator thereby causing said resinous material to gravitate outwardly as a result of centrifugal forces acting thereon during rotation, applying heat to said stator for curing the plastic material and concurrently melting the wax in said tubes to provide air ducts in said stator, and milling excess plastic material from the internal portions of said stator.

References Cited in the file of this patent

UNITED STATES PATENTS

| | | |
|---|---|---|
| 1,913,138 | Apple | June 6, 1933 |
| 2,313,379 | Wood | Mar. 9, 1943 |
| 2,473,842 | Askey | June 21, 1949 |
| 2,602,785 | Wiles | July 8, 1952 |
| 2,653,255 | Baudry et al. | Sept. 22, 1953 |
| 2,668,925 | Bloser | Feb. 9, 1954 |
| 2,814,744 | Demetriou | Nov. 26, 1957 |

FOREIGN PATENTS

| | | |
|---|---|---|
| 660,910 | Great Britain | Nov. 14, 1951 |